(12) United States Patent
Lewin-Eytan et al.

(10) Patent No.: US 10,558,822 B2
(45) Date of Patent: Feb. 11, 2020

(54) ENFORCING ANONYMITY IN THE AUDITING OF ELECTRONIC DOCUMENTS

(71) Applicant: Oath Inc., New York, NY (US)

(72) Inventors: Liane Lewin-Eytan, Binyamina (IL); Dotan Di Castro, Haifa (IL); Eyal Zohar, Shimshit (IL); Yoelle Maarek, Haifa (IL); Ran Wolff, Geva-Carmel (IL); Doug Sharp, San Francisco, CA (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 14/969,201

(22) Filed: Dec. 15, 2015

(65) Prior Publication Data
US 2017/0169251 A1 Jun. 15, 2017

(51) Int. Cl.
G06F 17/20 (2006.01)
G06F 21/62 (2013.01)
G06F 17/22 (2006.01)
H04L 12/58 (2006.01)

(52) U.S. Cl.
CPC ...... *G06F 21/6254* (2013.01); *G06F 17/2211* (2013.01); *G06F 17/2247* (2013.01); *H04L 51/046* (2013.01)

(58) Field of Classification Search
CPC combination set(s) only.
See application file for complete search history.

(56) References Cited

U.S. PATENT DOCUMENTS

| 9,652,530 | B1* | 5/2017 | Bendersky | G06F 16/83 |
| 2008/0189608 | A1* | 8/2008 | Nurmi | G06F 17/2288 715/273 |
| 2009/0132669 | A1* | 5/2009 | Milliken | G06F 21/562 709/206 |
| 2009/0307256 | A1* | 12/2009 | Tiyyagura | G06F 16/81 |

(Continued)

OTHER PUBLICATIONS

Butler, D., A Short Survey of Document Structure Similarity Algorithms (Year: 2004).*

(Continued)

*Primary Examiner* — Shahid K Khan
(74) *Attorney, Agent, or Firm* — Cooper Legal Group, LLC

(57) ABSTRACT

Methods, systems, and computer-readable media for anonymizing electronic documents. In accordance with one or more embodiments, structurally-similar electronic documents can be identified among a group of electronic documents (e.g., e-mail messages, documents containing HTML formatting, etc.). A hash function can be specifically tailored to identify the similarly structured documents. The structurally-similar electronic documents can be grouped into a same equivalence class. Masked anonymized document samples can be generated from the structurally-similar electronic documents utilizing the same equivalence class, thereby ensuring that the anonymized document samples when viewed as a part of an audit remain anonymous. An online process is provided to guarantee k-anonymity of the users over the entire lifetime of the auditing process. An auditor's productivity can be measured based on the amount of content revealed to the auditor within the samples he is assigned. The auditor's productivity is maximized while ensuring anonymization over the lifetime of the audit.

20 Claims, 8 Drawing Sheets

```
Dear XXXX XXXXX:

We've received the order you placed on MyShoppings.com. Your new items should be
at your door within 7 to 8 business days.

Your order summary is below. Be sure to print this email or write down your order
number TS0TXXXXXX for your records. We'll send you another email as soon as your
order ships.

Thanks for shopping with us!
Summary for order number TS0TXXXXXX
Order placed 1XXXXXXXXX PM ET on JXX XX, 2015

Ship To
XXXXXXXXXXXXXX
411 XXXXXXXXX
XXXXXXXXXXXX

Summary of Charges
Order Subtotal:        $5X.XX
XXX XXX X             (-$XX).00
Shipping & Handling    Free
Tax:                   $XXXX
Order Total:           $XX.XX Payment Info
MyShoppingXXXX Card:   XXX XXXX XXXX X1X
```

74

(56) References Cited

U.S. PATENT DOCUMENTS

| | | | |
|---|---|---|---|
| 2010/0077301 A1* | 3/2010 | Bodnick | G06Q 30/02 715/274 |
| 2013/0152158 A1* | 6/2013 | Yoshihama | G06F 21/60 726/1 |

OTHER PUBLICATIONS

Manku et al., Detecting Near-Duplicates for Web Crawling (Year: 2007).*

Grigalis et al., Using XPaths of Inbound Links to Cluster Template-Generated Web Pages (Year: 2006).*

Ailon, N. et al., "Threading Machine Generated Email," Proceedings of the sixth ACM International Conference on Web Search and Data Mining (2013) pp. 405-414.

Broder, A. Z. et al., "Syntactic clustering of the Web," Computer Networks and ISDN Systems (1997) 29:1157-1166.

Broder, A. Z., "On the resemblance and containment of documents," Proceedings of the Compression and Complexity of Sequences (1997) 9 pages.

Broder, A. Z. et al., "Min-Wise Independent Permutations," Journal of Computer and System Sciences (2000) 60:630-659.

Broder, A. Z., "Identifying and Filtering Near-Duplicate Documents," Combinatorial Pattern Matching 11th Annual Symposium, CPM 2000, Montreal, Canada, Jun. 21-23, Proceedings, Giancarlo, R. et al., (Eds.), Springer-Verlag, Berlin, pp. 1-10.

EU Directive. 95/46/ec of the European parliament and of the council of Oct. 24, 1995 on the protection of individuals with regard to the processing of personal data and on the free movement of such data. Official Journal of the CE (1995) 23(6), 7 pages.

Fung, B. C. M. et al., "Anonymity for Continuous Data Publishing," Proceedings of the 11th International Conference on Extending Database Technology: Advances in Database Technology (2008) pp. 264-275.

Google Privacy Policy, Jun. 2015. http://google.com/intl/en/policies/privacy/, 10 pages.

Grbovic, M. et al., "How many folders do you really need? Classifying email into a handful of categories," Proceedings of the 23rd ACM International Conference on Conference on Information and Knowledge Management (2014) pp. 869-878.

Guihaire, V. et al., "Transit network design and scheduling: A global review," Transportation Research Part A (2008) 42:1251-1273.

Heintze, N., "Scalable Document Fingerprinting," Proceedings of the USENIX Workshop on Electronic Commerce (1996) 10 pages.

Henzinger, M., "Finding Near-Duplicate Web Pages: A Large-Sclae Evaluation of Algorithms," Proceedings of the 29th annual international ACM SIGIR conference on Research and Development in Information Retrieval, (2006) pp. 284-291.

Lefevre, K. et al., "Mondrian Multidimensional K-Anonymity," Proceedings of the 22nd International Conference on Data Engineering Apr. 3-7, 2006, 11 pages.

Manber, U., "Finding Similar Files in a Large File System," USENIX Winter 1994 Technical Conference, 11 pages.

Microsoft Services Agreement, Jun. 2014, http://windows.microsoft.com/en-us/windows/microsoft-services-agreement, 14 pages.

Ohm, P., "Broken Promises of Privacy: Responding to the Surprising Failure of Anonymization," UCLA Law Review, Research Information Network (2009) 57(6):1701-1777.

Rivest, R., "The MD5 Message-Digest Algorithm," Request for Comments: 1321, MIT Laboratory for Computer Science and RSA Data Security, Inc., Apr. 1992, 12 pages.

Samarati, P. et al., "Protecting Privacy when Disclosing Information: κ-Anonymity and Its Enforcement through Generalization and Suppression," Technical Report SRI-CSL-98-04, Computer Science Laboratory, SRI International (1998) 19 pages.

Shmueli, E. et al., "Limiting disclosure of sensitive data in sequential releases of databases," Information Sciences (2012) 191:98-127.

US Dept. of HHS. Standards for privacy of individually identifiable health information; final rule, Aug. 2002, 55 pages.

W3C. XML Path Language (XPath) Version 1.0. http://www.w3.org/TR/xpath/, Nov. 1999, 12 pages.

W3C. Document Object Model (DOM) Level 3. http://www.w3.org/DOM/DOMTR#dom3, Apr. 2004, 1 page.

Wang, K. et al., "Anonymizing Sequential Releases," Proceedings of the 12th ACM SIGKDD International Conference on Knowledge Discovery and Data Mining (2006) pp. 414-423.

Yahoo. Privacy center, Sep. 2014. https://policies.yahoo.com/us/en/yahoo/privacy/index.htm, 3 pages.

* cited by examiner

Dear XXXX XXXXX:

We've received the order you placed on MyShoppings.com. Your new items should be at your door within 7 to 8 business days.

Your order summary is below. Be sure to print this email or write down your order number TS0TXXXXXX for your records. We'll send you another email as soon as your order ships.

Thanks for shopping with us!
Summary for order number TS0TXXXXXX
*Order placed 1XXXXXXXXX PM ET on JXX XX, 2015*

Ship To
XXXXXXXXXXXXXX
411 XXXXXXXXX
XXXXXXXXXXXX

Summary of Charges
Order Subtotal:         $5X.XX
XXX XXX X               (-$XX).00
Shipping & Handling        Free
Tax:                    $XXXX
Order Total:            $XX.XX Payment Info
MyShoppingXXXX Card:    XXX XXXX XXXX X1X

ENFORCING ANONYMITY IN THE AUDITING OF ELECTRONIC DOCUMENTS

BACKGROUND

This application relates generally to electronic documents such as e-mail messages and HTML (Hyper Text Mark-up Language) based documents. More particularly, this application relates to the auditing of electronic documents in large-scale Web email services. In addition, the application is related to DOM (Document Object Model) applications and DOM processing.

In the last decade, Web email has evolved, very much like regular snail mail, into an electronic messaging paradigm dominated by machine-generated messages. Some recent studies have verified that automated scripts generate more than 90% of non-spam Web email. Such messages vary in importance. Some represent highly valuable information (and often sensitive personal details), such as shipment notifications, flight itineraries, bank statements, etc., while others are almost completely composed of junk mail (while not being malicious), such as promotions or newsletters. One common characteristic of these machine-generated messages is that most are highly structured documents that utilize rich HTML formatting, which repeats at a large scale, rendering them more "predictable." This enables the application of various automated data extraction or learning methods. Features and applications driven by such methods are ubiquitous in Web email. Analyzing mail content is critical in order to support many product features, such as, for example, customized search results, tailored advertising, and spam and malware detection.

As much as these methods are, by design, automated, they still require human intervention for debugging, evaluation, and research and development. Major Web email services restrict access to such personal information to a small group of employees referred to as auditors. Auditors operate under strict contractual confidentiality obligations, which require, among other factors that user privacy be maintained during auditing. Automated mechanisms are needed which support privacy and preserve auditing.

BRIEF SUMMARY

Embodiments are disclosed for enforcing a level of anonymity in the auditing of electronic documents, such as e-mail messages and HTML formatted documents.

In accordance with an example embodiment, a method for anonymizing electronic documents can be implemented in which structurally similar electronic documents are identified in a group of electronic documents (e.g., e-mail messages, documents having HTML formatting, etc.). The structurally similar electronic documents can be grouped into the same equivalence class. Masked anonymized document samples are generated from the structurally similar electronic documents utilizing the same equivalence class, thereby ensuring that anonymized document samples, when viewed as a part of an audit, remain anonymous. A hash function can be specifically tailored to identify the similarly structured documents.

In another example embodiment, a step or operation can be provided for delivering the masked anonymized document samples so that the anonymity of each user associated with a masked anonymized document among the masked anonymized document samples is preserved over the entire lifetime of the audit. The productivity of one or more auditors associated with the auditing process can be measured based on the amount of content including the masked anonymized document samples revealed to the auditor(s). The auditor's productivity is thus measured while ensuring anonymization.

Various embodiments may be implemented via a device or system comprising a processor and a memory. The processor and memory are configured to perform one or more of the above described method operations. Other embodiments may be implemented via a computer readable storage medium having computer program instructions stored thereon that are arranged to perform one or more of the above described method operations.

These and other features and advantages of the disclosed embodiments will be presented in more detail in the following specification and the accompanying figures, which illustrate by way of example the principles of the disclosed embodiments.

BRIEF DESCRIPTION OF THE DRAWINGS

FIG. 7 illustrates a masked email sample of a shopping receipt, in accordance with an example embodiment.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is not, therefore, intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
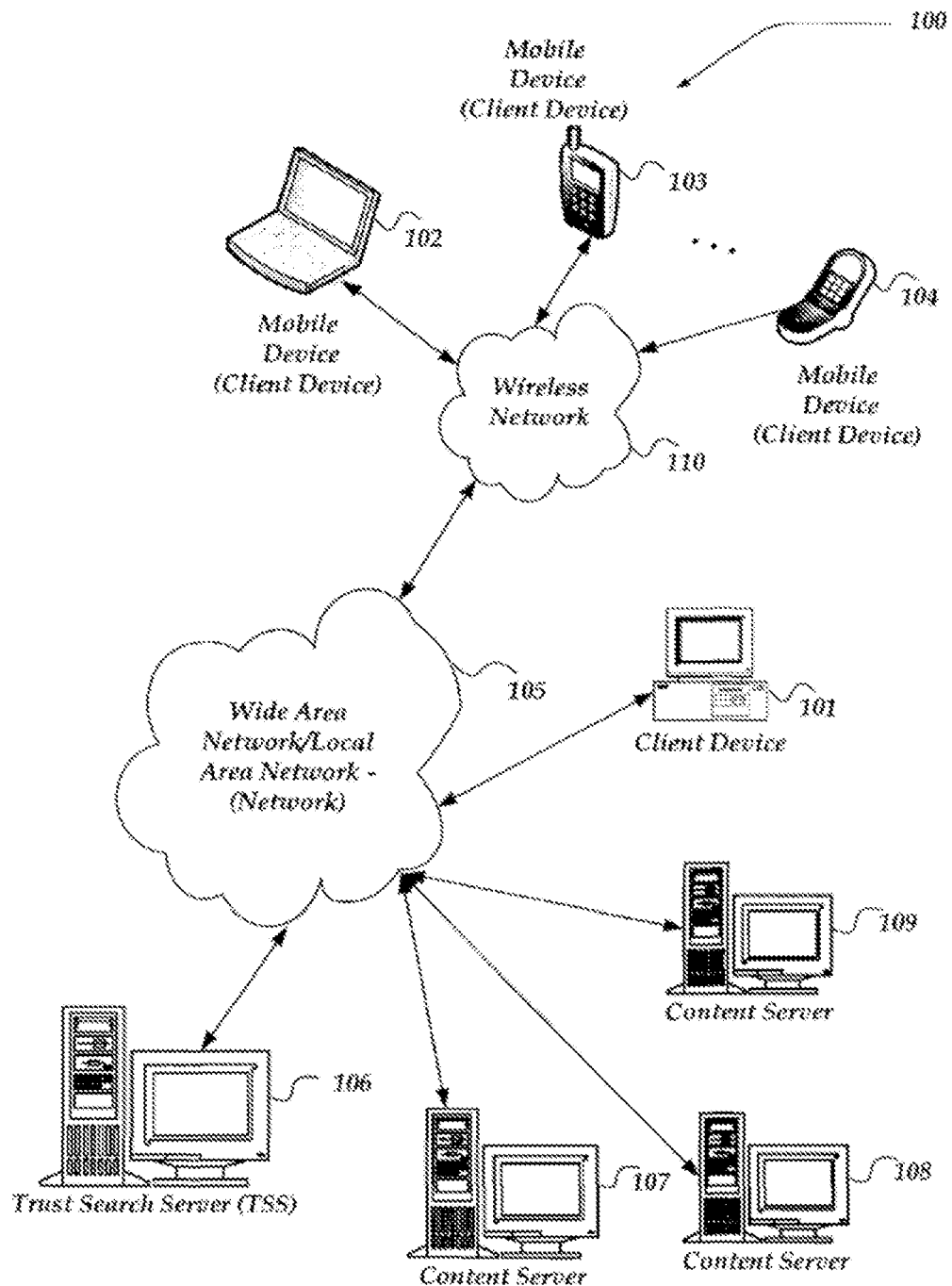
FIG. 1 illustrates a schematic diagram of one embodiment of an environment in which a system for enforcing anonymity in the auditing of electronic documents may operate.

FIG. 1 shows a schematic diagram depicting an example embodiment of a system 100 composed of one or more networks and including one or more servers and clients. Other embodiments that may vary, for example, in terms of arrangement or in terms of type of components are also intended to be included within the claimed subject matter. The system 100 depicted in FIG. 1, for example, can include a variety of networks, such as a WAN (Wide Area Network)/LAN (Local Area Network) 105, a wireless network 110, a variety of devices, such as a client device 101 and mobile devices 102, 103, 104, and a variety of servers, such as content servers 107, 108, 109 and a search server 106. In the example configuration depicted in FIG. 1, mobile devices 102, 103, and 104 are client devices that communicate wirelessly within system 100 through the wireless network 110. The WAN/LAN network 105 also communicates with the wireless network 110. Note that each of the servers 106, 107, 108, and/or 109 contain memory and processor components, which can store and process operations such as those shown and described with respect to, for example, FIGS. 4 and 6, and described elsewhere herein.

A content server such as content servers 107, 108, 109 may include a device that includes a configuration to provide content via a network to another device. A content server may, for example, host a site, such as a social networking site, examples of which may include, without limitation, Flickr®, Twitter®, Facebook®, LinkedIn®, or a personal user site (e.g., such as a blog, vlog, online dating site, etc.). A content server may also host a variety of other sites including, but not limited to, business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type, or programmable consumer electronics, etc.

A network such as network 105 and/or network 110 depicted in FIG. 1 can couple devices so that communications may be exchanged, such as between a server and a client device or other types of devices, including between wireless devices coupled via a wireless network, for example. A network may also include mass storage, such as network-attached storage (NAS), a storage area network (SAN), or other forms of computer or machine-readable media, for example. A network may include the Internet, one or more Local Area Networks (LANs), one or more Wide Area Networks (WANs), wire-line type connections, wireless type connections, or any combination thereof. Likewise, sub-networks may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network such as the wireless network 110 depicted in FIG. 1 may couple client devices with the network. That is, such a wireless network may employ stand-alone ad-hoc networks, mesh networks, wireless LAN (WLAN) networks, cellular networks, or the like. A wireless network such as wireless network 110 can further include a system of terminals, gateways, routers, or the like coupled by wireless radio links, or the like, which may move freely, randomly, or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Note that signal packets communicated via a network, such as a network of participating digital communication networks (e.g., networks 105, 110) may be compatible with or compliant with one or more protocols. Signaling formats or protocols employed may include, for example, TCP/IP, UDP, DECnet, NetBEUI, IPX, AppleTalk, or the like. Versions of the Internet Protocol (IP) may include IPv4 or IPv6.

The Internet refers to a decentralized global network of networks. The Internet includes Local Area Networks (LANs), Wide Area Networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc., that may route the signal packet in accordance with a target address and availability of a network path to the target address.

Figure 2:
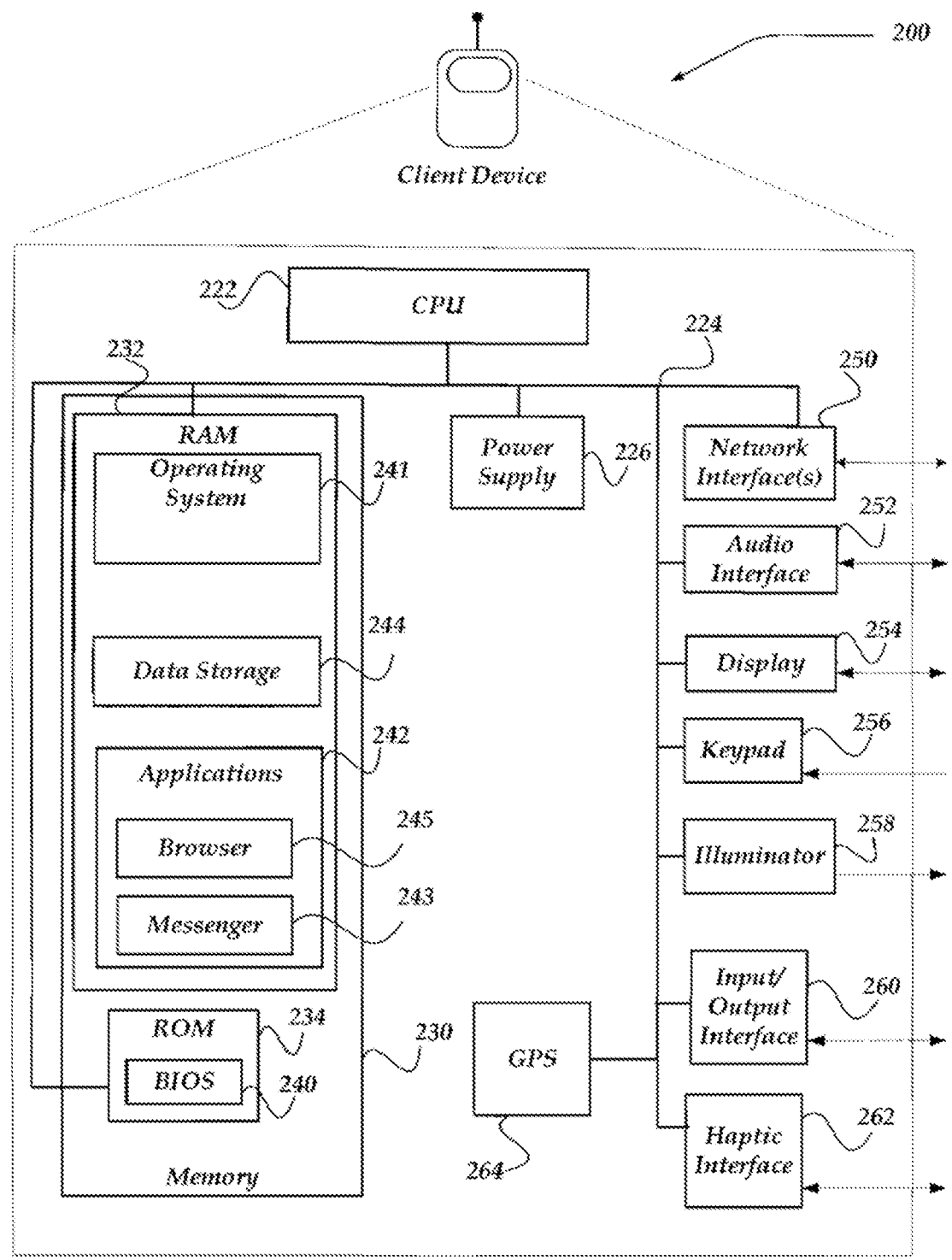
FIG. 2 illustrates a schematic diagram depicting one example embodiment of a client device for providing an application for enforcing anonymity in the auditing of electronic documents.

FIG. 2 illustrates a schematic diagram depicting one example embodiment of a client device 200 that may be used as, for example, one or more of the client devices 101, 102, 103, and 104 depicted in FIG. 1. The client device 200 may include a computing device capable of sending or receiving signals, such as via a wired or a wireless network such as, for example networks 105, 110 depicted in FIG. 1. It should be appreciated that although FIG. 2 depicts a client device 200, many or most of the operations described herein can be implemented via a server such as, for example, one or more of the servers 106, 107, 108, 109. In some embodiments, client device 200 may be implemented and function as, for example, a server such as one or more of the servers 106, 107, 108 and/or 109.

In some embodiments, the client device 200 may, for example, include or be implemented as a desktop computer or a portable device, such as a cellular telephone, a Smartphone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the foregoing devices, or the like.

A client device such as client device 200 may vary in terms of capabilities or features. The claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device such as client device 200 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples.

A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (e.g., such as fantasy sports leagues). The foregoing is provided to illustrate that claimed subject matter is intended to include a wide range of possible features or capabilities. Examples of such applications (or modules) include, for example, messenger 243, browser 245, and other applications or modules.

The example client device 200 shown in FIG. 2 generally includes a CPU (Central Processing Unit) 222 and/or other processors (not shown) coupled electronically via a system bus 224 to memory 230, power supply 226, and a network interface 250. The memory 230 can be composed of RAM (Random Access Memory) 232 and ROM (Read Only Memory) 234. Other components such as an audio interface 252, a display 254, a keypad 256, an illuminator 258, an input/output interface 260, a haptic interface 262, and a GPS (Global Positioning Satellite) unit 264 can also be electronically coupled via the system bus 224 to CPU 222, memory 230, power supply 226, and so on.

RAM 232 can store an operating system 241 and provide for data storage 244, and the storage of applications 242 such as, for example, browser 245 and messenger 243 applications. ROM 234 can include a BIOS (Basic Input/output System) 240, which is a program that the CPU 222 utilizes to initiate the computing system associated with client device 200. BIOS 240 can also manage data flow between operating system 241 and components such as display 254, keypad 256, and so on.

Applications 242 can thus be stored in memory 230 and may be "loaded" (i.e., transferred from, for example, memory 230 or another memory location) for execution by the client device 200. Client device 200 can receive user commands and data through, for example, the input/output interface 260. The client device 200, in accordance with instructions from operating system 241 and/or application(s) 242, may then act upon such inputs. The interface 260, in some embodiments, can serve to display results, whereupon a user may supply additional inputs or terminate a session.

The software application(s) 242 can include one or more modules such as modules 243, 245, and so on, which can, for example, implement instructions or operations such as those described herein. Examples of instructions that can be implemented by applications 242, for example, can include operations or steps such as those shown and described herein with respect to, for example, FIGS. 1-9 and described elsewhere herein.

The following discussion is intended to provide a brief, general description of suitable computing environments in which the disclosed methods and systems may be implemented. Although not required, the disclosed embodiments will be described in the general context of computer-executable instructions, such as program modules, being executed by a single computer. In most instances, a "module" constitutes a software application. However, a module may also be composed of, for example, electronic and/or computer hardware or such hardware in combination with software. In some cases, a "module" can also constitute a database and/or electronic hardware and software that interact with the database.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term "module," as utilized herein, may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the instructions or steps such as those shown in FIGS. 1-9 and discussed elsewhere herein can be implemented in some embodiments in the context of such a module or modules, sub-modules, and so on. Such modules can be implemented not only via client device 200 but also, for example, via servers such as the servers 106, 107, 108, and/or 109 shown in FIG. 1.

It can be appreciated that the example embodiments discussed herein, although discussed in the context of the anonymization of e-mail messages, can apply to any electronic document based on a mark-up language, such as HTML. For illustrative and exemplary purposes, however, the example embodiments focus on a mail specific anonymization mechanism based on a novel function that operates on a single mail message, which is referred to as a Mail-Hash. This Mail-Hash function leverages the rich DOM structure most machine-generated messages have and computes a signature that can be utilized to generate equivalence classes of messages. Grouping messages into equivalence classes can then be performed daily, while being able to efficiently cover billions of messages in any Web scale mail service. Additionally, messages are grouped in classes covering more than k recipients, so that k-anonymity can formally be verified.

The terms k-anonymity and k-anonymous or variations of this term as utilized herein refers to a type of anonymity and a property possessed by certain anonymized data. Data anonymization is a type of information sanitation whose intent is privacy protection. As utilized herein, the terms k-anonymity and k-anonymous or variations thereof also refer to the anonymization of electronic documents (e.g., e-mail messages, other HTML documents, etc.) with respect to at least a number k of recipients. Note that as utilized herein, the terms mail, e-mail, Web mail, and e-mail messages can be utilized interchangeably to refer to the same document or feature.

Message anonymization can be achieved by masking the variable content of the messages within the same class. The changes "delta" between these messages can then be hidden, utilizing the notion of a template also referred to as a mail template. A template is the non-hidden part of the message that is composed of its structure, that is, the fixed park among all messages in the same class. Because the masking process transforms all messages within a class into the same template, one can easily generate from the latter a nicely formatted mail sample that masks all parts of the message that might break k-anonymity.

In order to verify the benefits of this approach, the productivity of auditors can be considered for every sample they are shown. The more content an auditor can view, the more effective his or her reviewing or annotating task can be. Thus, a simple measure of content coverage can be utilized, which represents the amount of non-hidden mail content that the auditor(s) can view. One of the goals of the disclosed embodiments is to maximize content coverage in order for auditors to be highly selective, while enforcing the concept of k-anonymity.

Another challenge inherent to professional auditing is that auditors are exposed to increasing mail samples over their tenure. Consequently, k-anonymity needs to be considered over time. Fortunately, professional auditing includes the additional property that it is tightly controlled (which usually does not apply in common anonymized release settings). That is, auditors are employed by the mail service and, as such, can be strictly governed in terms of their access not only to the current but also to future and auxiliary datasets. Taking advantage of this property, the objective of releasing samples to be shown to an auditor on a daily basis can be considered, while retaining the k-anonymity of all releases over time.

In addition, the capacity of auditors can be taken into account to ensure that the number of samples that they can be assigned daily does not go beyond some threshold representing their daily capacity. The problem thus converges to an online mail auditing k-anonymization solution, whose objective is to release a bounded amount of samples to an auditor on a daily basis, while retaining the k-anonymity of all releases over time and maximizing visible content.

The disclosed embodiments thus provide three objectives. First, such embodiments provide the first definition of k-anonymity for auditing of mail messages. Second, a unique, surprising simple, yet efficient Mail-Hash function is introduced specifically tailored to identifying similarly structured mail messages. Third, an online mail auditing process is defined, which is guaranteed to preserve the k-anonymity of mail users over time, while maximizing the productivity of mail auditors. The feasibility of this approach can be demonstrated at a Web email scale by providing detailed results of a full system implemented over, for example, Yahoo® email. Note that an auditor or auditing functionalities can be implemented in some embodiments via a client device, for example, such as a client device 200 as described herein. However, various operational steps or operations such as those shown in, for example, FIGS. 4 and 6 and described elsewhere herein (e.g., the various modules shown and described with respect to FIGS. 8-9) can be implemented via a server such as one or more of the servers shown in FIG. 1.

To begin the discussion of mail k-anonymization, variables and terms can be defined. First, a mail dataset $D_t$ can be represented as a set of incoming mail messages $m_t[1]$, $m_t[2]$, ..., $m_t[n]$, received by the entire set of users during a time interval, t. For the sake of the simplicity, consider a single day as the default time interval, which fits a common process of daily data release. Another simplifying assumption is to abstract any incoming mail message into a list of entities, where an entity can be a sender or any character string in the subject or body of the message. A release $R_t$ can then be defined as a transformation of $D_t$ into a set of uniquely identifiable users (e.g., mail recipients) and associated entities. Reference can then be made to a tuple of entities associated with a same message $m_t[i]$, as a template, which is particularly convenient for representing machine-generated messages. A template can be implemented as a tuple of a sender and a character string, which can be altered for abstraction as discussed later herein. Such a character string can be derived not only from the subject but also, most frequently, from the body of the message.

A release $R_t^H$ can include the list of templates associated with a user u in $R_t$. For any user u, the set of users $[u]_t$ can be defined as the set of all users v such that $R_t^v = R_t^u$. A single release $R_t$ can fulfill the requirement of k-anonymity, if for any user u in $R_t$, it holds that $|[u]_t| \geq k$. In other words, user u is indistinguishable from at least k−1 other users in the release as it maps to exactly the same list of templates.

Figure 3:
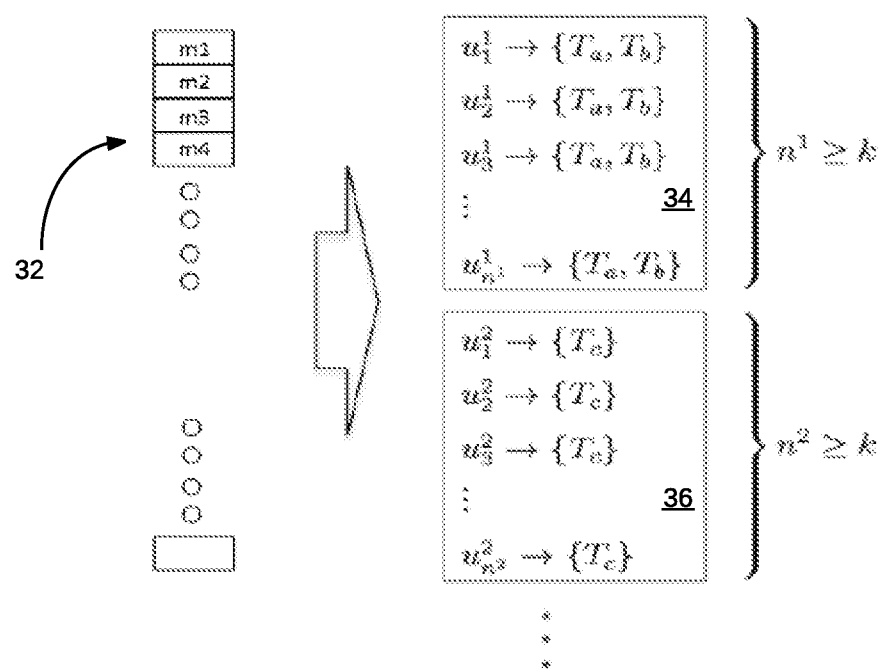
FIG. 3 illustrates a schematic diagram depicting two exemplary groups of users in a release, in accordance with an example embodiment.

FIG. 3 illustrates a schematic diagram depicting two exemplary groups of users in a release, in accordance with an example embodiment. FIG. 3 depicts the release with two user groups as shown at blocks 34, 36. Each group is of a size of at least k and includes users with exactly the same list of templates. In group $\{u_1^1, \ldots, u_{n^1}^1\}$ as shown at block 34, each user is associated with two templates $T_a, T_b$. In group $\{u_1^2, \ldots, u_{n^1}^2\}$ as indicated at block 36, each user is associated with a template $T_c$. Messages 32 (i.e., $m_1$ to $m_n$) are shown at the left side of FIG. 3 and are included in the mail dataset.

In the same spirit, a sequence of releases $R_1$ through $R_t$ is considered k-anonymous if, for every user u, the intersection of all $[u]_i$ have more than k users, $|\cap_{i=1}^t [u]_i| \geq k$. In other words, user u is indistinguishable from at least k−1 other users over all releases as they are associated with exactly the same list of templates over $R_1, \ldots, R_t$.

The transformation process involves generating a list of templates for any given user u, so as to render the data with sufficient information to auditors and at the same time ensure that u is indistinguishable from others. Each template is an abstraction of a message sent by a given sender to u and obtained by deleting terms or a sequence of terms (e.g., replacing them with a deletion marker*). This task can be referred to as masking. In addition, users or messages can be removed altogether if they cannot be k-anonymized. This task can be referred to as filtering.

Figure 4:
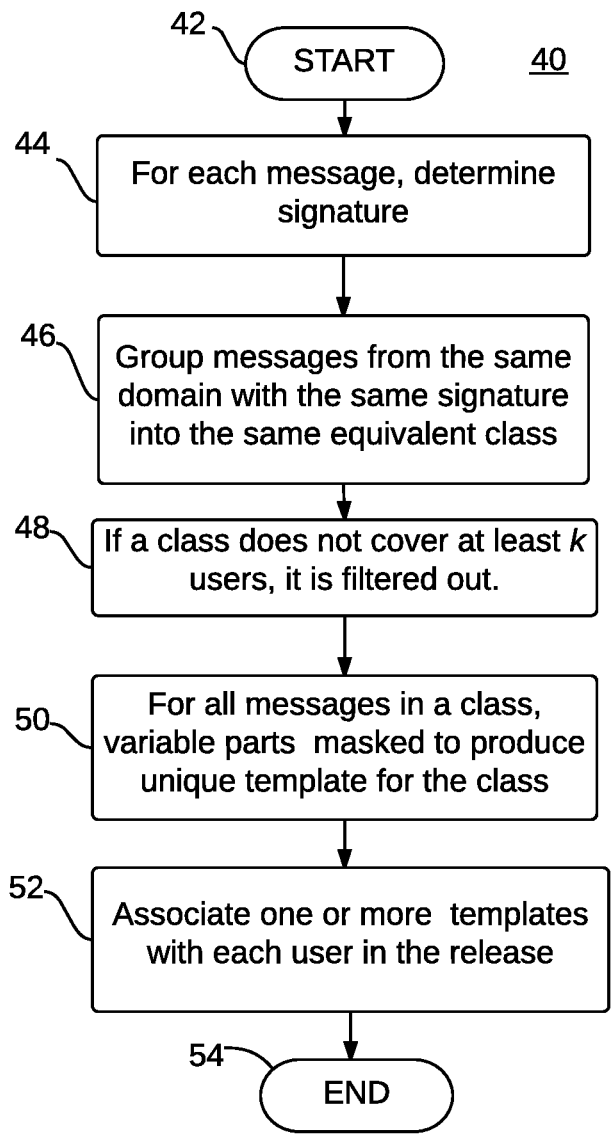
FIG. 4 illustrates a flow chart of operations depicting logical operational steps of a method for supporting masking and filtering, in accordance with an example embodiment.

FIG. 4 illustrates a flow chart of operations depicting logical operational steps of a method 40 for supporting masking and filtering, in accordance with an example embodiment. Note that in some embodiments the instructions and operations of method 40 shown in FIG. 4 can be stored in a memory of, for example, servers 106, 107, 108, and/or 109 and processed via such servers 106, 107, 108, and/or 109. In yet other embodiments, such instructions or operations can be stored in a memory and processed via a processor of, for example, a client device such as client device 200.

In order to support masking and filtering, mail messages first need to be identified that are sufficiently similar to one another so that k-anonymization is enforceable while allowing a maximum portion of content to remain unmasked. As shown at block 42, the process can be initiated. Then, as depicted at block 44, a step or operation can be implemented such that for each message a signature is determined (e.g., the signature is computed). Thereafter, as illustrated at block 46, a step or operation can be implemented to group messages from the same domain with the same signature into the same equivalent class. That is, messages originating from the same sender and having the same signature can be grouped into equivalence classes.

As indicated next at block 48, if a class does not cover at least k users, it is filtered out. That is, in order to guarantee k-anonymization, each such class needs to cover at least k users. Then, for all messages in a class, variable parts can be masked so as to produce a unique template for the class, as described at block 50. After the masking process, all messages in an equivalence class can be reduced to the same template. Once this portion of the process is complete, an operation can be implemented, as illustrated at block 52, to associate with each user in the release, one or more such templates, which drives the generation of mail samples that can be reviewed by the auditor. The process shown in FIG. 4 can then terminate, as illustrated at block 54. Note that the generation of mail samples can be further driven by an online process that indicates which samples can be assigned to auditor(s). This process can be implemented according to Algorithm 2, which is discussed in further detail herein.

Multiple techniques can be implemented for generating templates as well as for masking and for filtering. In order to select the most suitable method, reference is made again to the task at hand; namely assigning mail samples to auditors and maximizing their productivity, while maintaining the k-anonymity of every sample of mail they will be shown. The more unmasked data the auditor can view in a sample, the more selective the auditor can be. Therefore, it is worthwhile to evaluate the usefulness of a sample via a raw quantitative measure of content coverage. More specifically, the content coverage of a sample can be defined, or rather its underlying template and associated class, as the amount of data left in the template after masking, relative to the original source. The usefulness of a given release $R_t$, noted $CC[R_t]$, can be derived as the average content coverage of the templates in the release. In addition, each auditor is capable of reviewing only a limited number of mail samples per workday, so the number of daily samples that are assigned to an auditor can be limited to some threshold $\Gamma$.

Optimizing $R_t$ for content coverage, while not going over at most $\Gamma$ samples daily, however, is not sufficient. Indeed, as auditors are assigned new samples each day, they are exposed to more data and k-anonymization needs to be preserved over time. Therefore, it is necessary to generalize the problem to a new online problem, where one goal is to generate a new release $R_t$ every day, taking into consideration both the current dataset $D_t$ and previous releases $R_1, \ldots, R_{t-1}$, while retaining the k-anonymity of all releases. This new release should be generated so that the overall content coverage, denoted by CC, averaged over all releases, is maximized, and the number of samples assigned daily to an auditor is at most $\Gamma$. Note that we do consider the assignment of samples to multiple auditors, as auditors are obligated not to share or discuss sample data with each other. Thus, these are independent tasks.

In order to increase the chances of ensuring that enough users share the same templates in any mail release, it is desirable to be able to detect structurally similar messages, in an extremely fast and scalable manner, particularly when dealing with electronic documents such as Web email or various mark-up language based documents (e.g., HTML). The "Mail-Hash" is thus introduced as a novel mail message signature specifically designed to address this requirement. Such an approach is fast and simple, while providing superior results when dealing with the special case of anonymizing machine generated email (or other machine generated electronic documents) as will be discussed in greater detail herein.

Note that the Mail-Hash approach disclosed herein can be tailored both to machine-generated mail messages and other electronic documents that contain a great deal of HTML formatting common to numerous messages and documents, and to the specific task at hand, namely enforcing k-anonymization. Also, note that personal messages that contain much less formatting are in essence private and can be ignored in some example embodiments by design and are not shown to auditors.

One of the goals of a Mail-Hash is to generate a single hash value, referred to as a Mail Hash, for each mail message. The idea is to prune a DOM (Document Object Model) tree so as to leave only the XPath (XML Path Language) expressions (or "XPaths" for short), which lead to "textual leaves" constituting non-empty alphanumerical strings. Then, only the pruned DOM tree of the mail is signed, while ignoring the textual leaves and being resilient to some minor changes in the HTML formatting. In an example embodiment, in order to sign the pruned DOM tree, a Message Digest (MD) algorithm such as MD5 can be used over the ordered list of all XPath expressions. (Note that for simplicity, the pruned DOM tree can be referred to simply as the DOM tree). Although MD5, for example, has 128-bits, only the lower 64-bits are used due to the fact that it is largely sufficient for a collision-free operation when the number of inputs is on the order of billions.

An example Mail-Hash method or algorithm and its instructions and steps are shown below with respect to "Algorithm 1".

---

Algorithm 1 Mail-Hash

1: Input: mail message
2: Output: 64-bit signature
3: Parse the mail message to DOM tree
4: For each non-empty text element $e_i$ in the DOM tree, generate a simple XPath $t_i$ that leads from root to the text node, with all the elements along the path and necessary proximity positions
5: Concatenate all the XPath items $t_i$ into a single string T, by their DFS order in the DOM tree
6: The Mail-Hash is the lower 64-bits of the MD5 of T

---

Messages that have the same DOM structure but differ by their textual leaves will obtain the same Mail-Hash score. The details of an example Mail-Hash generation algorithm are thus shown above.

Figure 5:
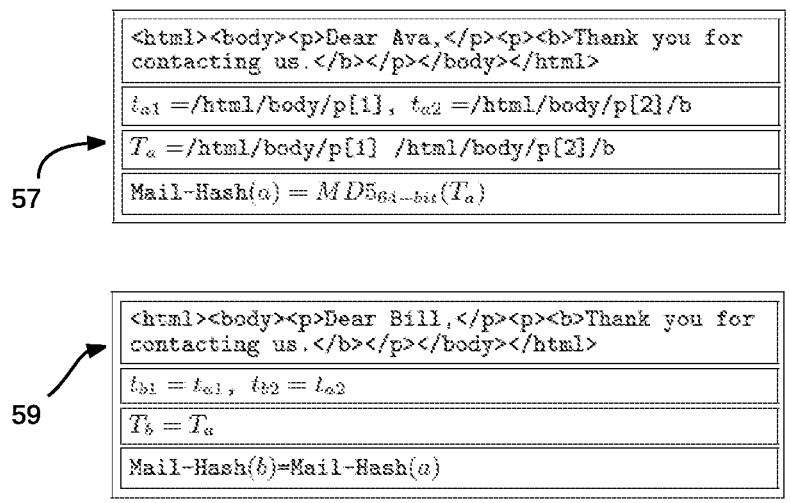
FIG. 5 illustrates identical mail-hash values for two similarly structured messages, in accordance with an example embodiment.

FIG. 5 illustrates identical mail-hash values for two similarly structured messages, in accordance with an example embodiment. Two examples of HTML mail messages and the detailed calculation of their Mail-Hash signatures are shown at blocks 57 and 59. Block 57 displays a short message with two non-empty textual leaves $e_{a1}$, $e_{a2}$. Therefore, it has two XPath expressions $t_{a1}, t_{a2}$ that form the concatenated string $T_a$. Block 59 presents a similar message sent to another receiver, with exactly the same HTML structure, but slightly different textual leaves due to the receiver's first name. Although $e_{b1} \neq e_{a1}$, the identical structure results in $\forall_i t_{ai} = t_{bi}$ the signatures of the two messages are identical.

The Mail-Mash value of each message can be computed in a single pass over the entire mail dataset, resulting in O(n) running time where n is the number of mail messages in the dataset. This is the lower bound on the running time of any algorithm that needs to explore an entire corpus. All messages sent from the same sender and sharing the same Mail-Hash value can be assigned to the same equivalence class. This process generates a large number of classes of various sizes, which can also cover the long-tail of mass senders, which send hundreds, as opposed to thousands, of daily messages.

The overall process of enforcing k-anonymity in the mail auditing process can be composed of three stages:
1. Grouping similar messages in equivalence classes based on the Mail-Hash function.
2. Masking entities in messages belonging to a same class so as to enforce k-anonymity (the output of this process is a list of templates, wherein each template represents an equivalence class).
3. The assignment of templates to an auditor (note that this is an online process where templates to be shown to a given auditor are selected on a daily basis, while preserving the k-anonymity of the entire process).

Figure 6:
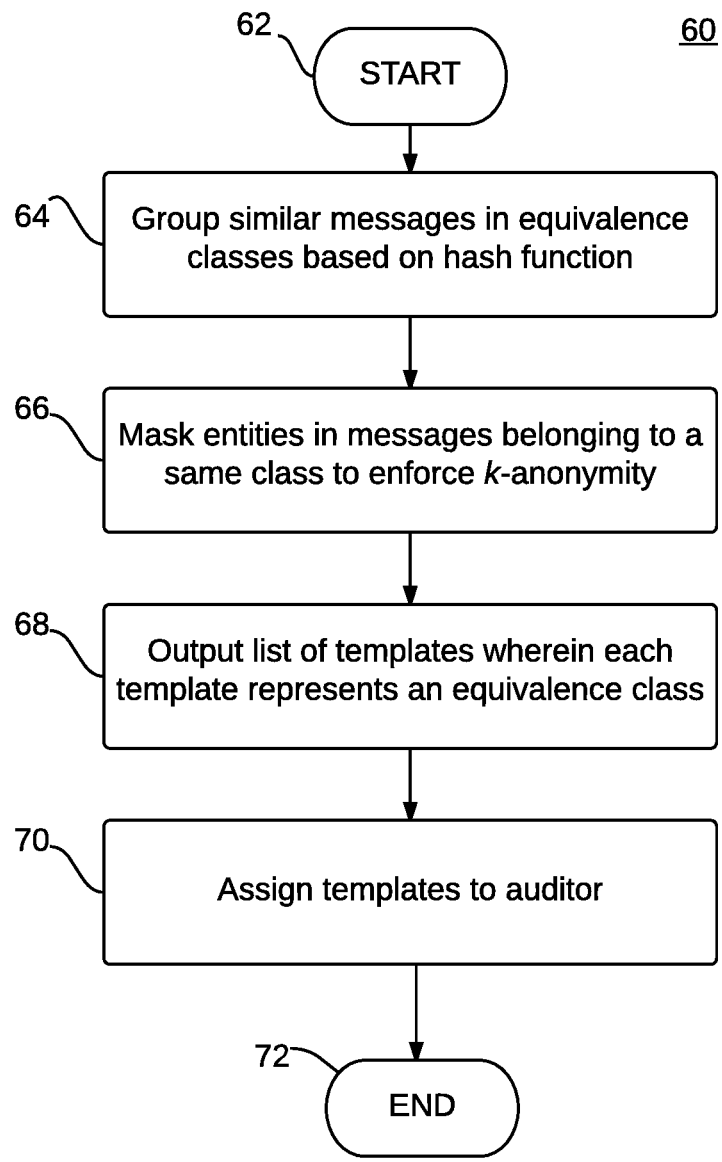
FIG. 6 illustrates a flow chart of operations depicting logical operational steps of a method for enforcing k-anonymity in a mail auditing process, in accordance with an example embodiment.

The above three-pronged approach is shown in the context of a flow chart as shown in FIG. 6. That is, FIG. 6 illustrates a flow chart of operations depicting logical operational steps of a method 60 for enforcing k-anonymity in a mail auditing process, in accordance with an example embodiment. Note that in some embodiments the instructions and operations of method 60 shown in FIG. 6 can be stored in a memory of, for example, servers 106, 107, 108, and/or 109 and processed via such servers 106, 107, 108, and/or 109. In yet other embodiments, such instructions or operations can be stored in a memory and processed via a processor of, for example, a client device such as client device 200.

The process can be initiated, as depicted at block 62. Next, as shown at block 64, a step or operation can be implemented in which similar messages are grouped in equivalence classes based on the Mail-Hash function. Thereafter, as depicted at block 66, a step or operation can be implemented for masking entities in messages belonging to the same class so as to enforce k-anonymity. The output of this process is a list of templates, as illustrated at block 68, wherein each template represents an equivalence class. Then, as described at block 70, templates are assigned to an auditor. As indicated above, this is an online process with templates to be shown to a given auditor selected on, for example, a daily basis, while preserving the k-anonymity of the entire process.

Using a Mail-Hash algorithm such as the example Mail-Hash algorithm described above, a Mail-Hash signature can be computed for each message and equivalence classes formed. In order to ensure k-anonymization, classes with less than k users can be filtered out. Note that in some example embodiments, a user can be counted only once per class, even if he or she received several messages belonging to the same class. That is, a user is counted only once. Counting a user more than once per template has no meaning because it converges to the exact same masked message (i.e., it is equal to the template).

FIG. 7 illustrates a masked e-mail sample of a shopping receipt 74, in accordance with an example embodiment. Regarding masking, each message can be considered as a set of textual entities, wherein each entity is a character string composed of all the characters appearing between two subsequent HTML tags. An individual entity can be retained if it contains at least one alphanumeric character. For each equivalence class, variable entities that are not common to all messages in the class are deleted from the messages, up to the point where all messages are identical (thus preserving anonymization at the class level).

The result is a template composed of a sequence of terms, delimited by a * deletion marker, which is common to all messages in the class. It can then be utilized to generate a masked mail sample (preserving mail formatting) that can be shown to auditors. Thus, a mail sample generated from a template can represent a large set of equivalent mail messages sent by an e-commerce site to a large number of users as, for example, an order confirmation. All sensitive personal information has automatically disappeared, such as the name of recipient following "Dear" or his address in the "Ship to" field, without necessitating any deep parsing or semantic analysis. Yet some common qualifiers, such as the prefix TS0T in the order number, can be preserved, as shown in the example shopping receipt 74 depicted in FIG. 7.

After the generation of the list of daily templates, the goal is to generate a daily release globally preserving k-anonymity. The release is composed of at most Γ templates that will be assigned to an auditor. For each message template m obtained from an equivalence class c, we denote by $U_m$ the set of the recipients of the messages in c. It is desirable to avoid the worst case scenario in which presenting two different templates associated with the same user might violate k-anonymization due to the connection between their content. Consequently, once a user is associated with a template shown to the auditor, the same user cannot be associated with any future template shown to the same auditor.

The daily assignment process of templates to the auditor can be described by reference to, for example, Algorithm 2, which is shown further below. Such an algorithm can be implemented as a simple greedy algorithm, which selects the templates at random. For each chosen template m, the algorithm chooses k random users from $U_m$. These will be the users associated with template m. Then these users are deleted from the sets of users $U_m'$ of all other templates, ensuring that each user will be associated with, at most, a single assigned template. Algorithm 2 (shown below) can be naturally extended to operate online over a sequence of days. For each day t, we remove users who were chosen during previous days from the user sets of all templates created during each day t. During this process, templates with a remaining set of less than k users can be filtered out.

Although the number of templates that can be shown to an auditor may be increased by using a different heuristic, as will be explained shortly below, this is not necessary. Indeed, in the context of extremely large scale traffic covering millions of users, the example Algorithm 2 allows the daily assignment of templates to an auditor over a lifetime while adhering to the constraint of assigning at most Γ templates per day. The generation of mail samples can be further driven by an online process that indicates which samples can be assigned to the auditor(s). This process can be implemented according to Algorithm 2.

The example "Algorithm 2" and its instructions or steps are shown below:

| Algorithm 2 Daily Release |
|---|
| 1: Input: Set of templates M, parameters k ≥ 2, Γ ≤ \|M\| |
| 2: Output: A set Q ≤ Γ of templates to display |
| 3: while M is non-empty and \|Q\| < Γ do |
| 4:    Choose at random a template m ∈ M |
| 5:    Remove m from M |
| 6:    If \|m\| ≥ k then |
| 7:        Add m to Q |
| 8:        Choose at random a set $u_m(k)$ of k users from $U_m$ |
| 9:        Remove the k chosen users from the user set of every template m' ∈ M |
| 10:       Update $U_{m'} = U_{m'} \setminus u_m(k)$ |
| 11:   end if |
| 12: end while |

Thus, k-anonymity holds for the online mail auditing k-anonymization problem by applying the 3-phase process described herein. By definition, k-anonymity holds for each user at the template level. This follows the fact that a template represents identical masked samples associated with at least k users. Furthermore, k-anonymity holds for each daily release following the fact that a user is associated with only a single template assigned to the auditor. Finally, k-anonymity holds for the entire online process due to the fact that this constraint is kept continuously for the entire lifetime period: once a user has been associated with an assigned template, he or she will never be associated with any future template.

The use of k-anonymization offers a number of advantages, such as, for example, protecting individual privacy and as a practical tool for protecting individuals against inadvertent intrusion into their privacy. The k-anonymity approach may break when there is lax control of auxiliary releases of information. In the example embodiments, however, the exposure of internal auditors to such auxiliary releases may be limited via internal regulation. Optimal k-anonymization with respect to any non-trivial optimization criteria may be difficult. Consequently, most k-anonymization techniques are heuristic. A unique aspect of the example embodiments, however, is that the choice of classes of messages will be co-anonymized, which relies on a deep domain understanding (e.g., mail data characteristics and traffic).

Another advantage is that the disclosed approach can consider sequential releases in a large-scale data environment. Considering billions of new daily (e.g., mail) documents, example embodiments provide a complete solution enforcing k-anonymity over time, which demonstrates through Web scale experiments that k-anonymity can be applied over a lifetime period, while producing a k-anonymized release that maximizes content coverage daily.

The novel problem of k-anonymization for human auditing of mail messages is thus addressed by the example embodiments disclosed herein, which is timely given the growing concerns of users over the privacy of their inboxes. Embodiments focus on enforcing the k-anonymity of recipients of machine-generated messages while maximizing the auditors' productivity, according to a generic quantitative measure of content coverage. The disclosed mechanism guarantees k-anonymization by grouping structurally-similar messages into a same equivalence class, and by generating for such classes, masked mail samples that can safely be assigned to auditors over time.

Figure 8:
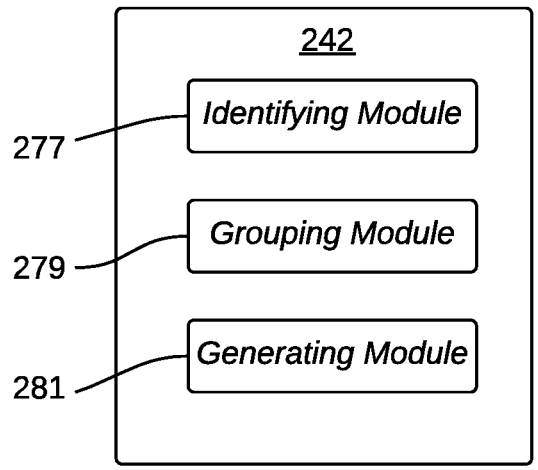
FIGS. 8-9 illustrates in greater detail the applications of the client device depicted in FIG. 2, in accordance with an example embodiment.
Figure 9:
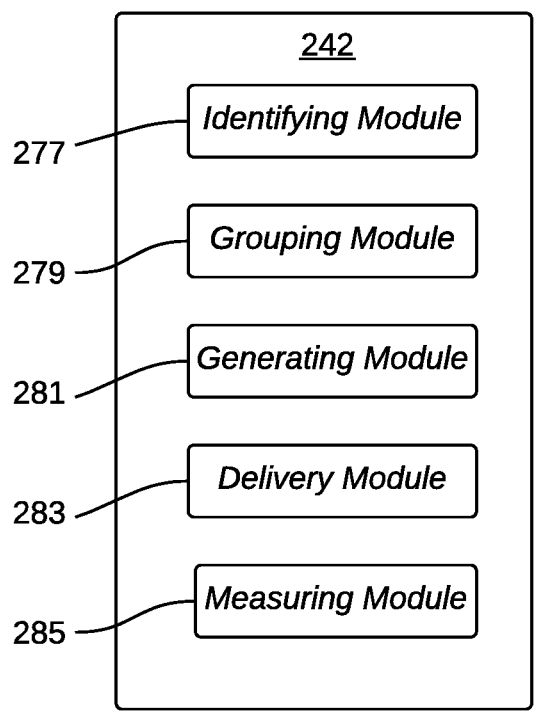

FIGS. 8-9 illustrates in greater detail the applications 242 of the client device 200 depicted in FIG. 2, in accordance with an example embodiment. In some embodiments, the applications 242 of the system or client device 200 can be stored in a non-transitory medium executable by processor circuitry (e.g., CPU 222 shown in FIG. 2) for anonymizing electronic documents. In other embodiments, however, such modules or applications can be stored in a memory of a server such as one or more of the servers shown in FIG. 1 and processed via processors associated with such servers. In other words, such applications may be processed not only via a client side device but also via servers, such as those shown, for example, in FIG. 1.

In any event, the system or applications 242 can include an identifying module 277 executable by processor circuitry for identifying structurally-similar electronic documents among a plurality of electronic documents; a grouping module 279 executable by processor circuitry for grouping the structurally-similar electronic documents into a same equivalence class, and a generating module 281 executable by processor circuitry for generating masked anonymized document samples from the structurally-similar electronic documents utilizing the same equivalence class, thereby ensuring that the anonymized document samples when viewed as a part of an audit remain anonymous with respect to a particular number of recipients.

In the example embodiment shown in FIG. 9, the system or applications 242 can also include a delivery module executable by processor circuitry for continuously delivering the masked anonymized document samples so that over time, an anonymity of each user associated with a masked anonymized document among the masked anonymized document samples is preserved over an entire lifetime of an audit. The system or applications 242 can further include in some embodiments, a measuring module executable by processor circuitry for measuring a productivity of at least one auditor associated with the audit based on an amount of content of the masked anonymized document samples revealed to the at least one auditor.

Methods, systems, and computer-readable media are thus disclosed for anonymizing electronic documents. In accordance with one or more embodiments, structurally-similar electronic documents can be identified among a group of electronic documents (e.g., e-mail messages, documents containing HTML formatting, etc.). A hash function is specifically tailored to identify the similarly structured documents. The structurally-similar electronic documents can be grouped into a same equivalence class. Masked anonymized document samples can be generated from the structurally-similar electronic documents utilizing the same equivalence class, thereby ensuring that the anonymized document samples when viewed as a part of an audit remain anonymous. An online process is provided to guarantee k-anonymity of the users over the entire lifetime of the audit.

An auditor's productivity can be measured based on the amount of content revealed to the auditor within the samples he is assigned (the amount of revealed content is the original content that is presented to the auditor without being masked). The auditor's productivity is maximized while ensuring anonymization over the lifetime of the audit.

Thus, example embodiments illustrated in FIGS. 1-9 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:

1. A method for anonymizing electronic documents, comprising:
   identifying structurally-similar electronic documents among a plurality of electronic documents;
   grouping said structurally-similar electronic documents into a same equivalence class;
   generating masked anonymized document samples from said structurally-similar electronic documents by determining that one or more parts of said structurally-similar electronic documents are variable and masking the one or more parts to produce one or more masked anonymized document samples comprising at least some hidden content and at least some non-hidden content;
   providing, for presentation to one or more auditors, at least one of said masked anonymized document samples;
   measuring a first productivity of a first auditor of the one or more auditors based on an amount of non-hidden content of a first portion of said masked anonymized document samples presented for review to said first auditor; and
   measuring a second productivity of a second auditor of the one or more auditors based on an amount of non-hidden content of a second portion of said masked anonymized document samples presented for review to said second auditor, wherein said first productivity of said first auditor is greater than said second productivity of said second auditor based upon the amount of non-hidden content of said first portion of said masked anonymized document samples revealed to said first auditor exceeding the amount of non-hidden content of said second portion of said masked anonymized document samples revealed to said second auditor.

2. The method of claim 1, wherein said electronic documents comprise e-mail messages.

3. The method of claim 1, wherein said electronic documents are configured from a mark-up language.

4. The method of claim 1, said grouping comprising grouping a first set of electronic documents into a first equivalence class responsive to:
   determining that said electronic documents of said first set meet a similarity threshold.

5. The method of claim 1, comprising continuously delivering said masked anonymized document samples so that over time, an anonymity of each user associated with a masked anonymized document among said masked anonymized document samples is preserved over an entire lifetime of an audit.

6. The method of claim 1, wherein said providing is based upon a capacity of each of said one or more auditors.

7. The method of claim 1, wherein said structurally-similar electronic documents among said plurality of electronic documents are identified utilizing a hash function tailored to identify similarly structured electronic documents,
   wherein said hash function generates at least one message signature for each electronic document of said plurality of electronic documents by:
      parsing an electronic document to a Document Object Model (DOM) tree;
      pruning the DOM tree to generate a pruned DOM tree comprising textual leaves comprising non-empty alphanumeric strings; and
      signing the pruned DOM tree to generate a message signature for the electronic document,
   wherein said hash function generates a same message signature for a first electronic document and a second electronic document that have a same DOM structure but different textual leaves.

8. A system, implemented at least in part via a processor, comprising:
   an identifying module for identifying structurally-similar electronic documents among a plurality of electronic documents;

a grouping module for grouping said structurally-similar electronic documents into a same equivalence class;

a generating module for generating masked anonymized document samples from said structurally-similar electronic documents by determining that one or more parts of said structurally-similar electronic documents are variable and masking the one or more parts to produce one or more masked anonymized document samples comprising at least some hidden content and at least some non-hidden content; and a measuring module for:
    measuring a first productivity of a first auditor based on an amount of non-hidden content of a first portion of said masked anonymized document samples presented for review to said first auditor; and
    measuring a second productivity of a second auditor based on an amount of non-hidden content of a second portion of said masked anonymized document samples presented for review to said second auditor, wherein said first productivity of said first auditor is greater than said second productivity of said second auditor based upon the amount of non-hidden content of said first portion of said masked anonymized document samples revealed to said first auditor exceeding the amount of non-hidden content of said second portion of said masked anonymized document samples revealed to said second auditor.

9. The system of claim 8, wherein said electronic documents comprise e-mail messages.

10. The system of claim 8, wherein said electronic documents are configured from a mark-up language.

11. The system of claim 8, comprising a delivery module for providing, for presentation to one or more auditors, at least one of said masked anonymized document samples.

12. The system of claim 8, comprising a delivery module for continuously delivering said masked anonymized document samples so that over time, an anonymity of each user associated with a masked anonymized document among said masked anonymized document samples is preserved over an entire lifetime of an audit.

13. The system of claim 11, wherein said providing is based upon a capacity of each of said one or more auditors.

14. The system of claim 8, wherein said structurally-similar electronic documents among said plurality of electronic documents are identified utilizing a hash function tailored to identify similarly structured electronic documents,
    wherein said hash function generates at least one message signature for each electronic document of said plurality of electronic documents by:
        parsing an electronic document to a Document Object Model (DOM) tree;
        pruning the DOM tree to generate a pruned DOM tree comprising textual leaves comprising non-empty alphanumeric strings; and
        signing the pruned DOM tree to generate a message signature for the electronic document.

15. A non-transitory computer-readable storage medium comprising instructions that when executed perform operations comprising:
    identifying structurally-similar electronic documents among a plurality of electronic documents;
    grouping said structurally-similar electronic documents into a same equivalence class;
    generating masked anonymized document samples from said structurally-similar electronic documents by determining that one or more parts of said structurally-similar electronic documents are variable and masking the one or more parts to produce one or more masked anonymized document samples comprising at least some hidden content and at least some non-hidden content;
    providing, for presentation to one or more auditors, at least one of said masked anonymized document samples;
    measuring a first productivity of a first auditor of the one or more auditors based on an amount of non-hidden content of a first portion of said masked anonymized document samples presented for review to said first auditor; and
    measuring a second productivity of a second auditor of the one or more auditors based on an amount of non-hidden content of a second portion of said masked anonymized document samples presented for review to said second auditor.

16. The non-transitory computer-readable storage medium of claim 15, wherein said electronic documents comprise e-mail messages.

17. The non-transitory computer-readable storage medium of claim 15, wherein said electronic documents are configured from a mark-up language.

18. The non-transitory computer-readable storage medium of claim 15, the operations comprising:
    continuously delivering said masked anonymized document samples so that over time, an anonymity of each user associated with a masked anonymized document among said masked anonymized document samples is preserved over an entire lifetime of an audit.

19. The non-transitory computer-readable storage medium of claim 15, wherein said providing is based upon a capacity of each of said one or more auditors.

20. The non-transitory computer-readable storage medium of claim 15, wherein said structurally-similar electronic documents among said plurality of electronic documents are identified utilizing a hash function tailored to identify similarly structured electronic documents,
    wherein said hash function generates at least one message signature for each electronic document of said plurality of electronic documents by:
        parsing an electronic document to a Document Object Model (DOM) tree;
        pruning the DOM tree to generate a pruned DOM tree comprising textual leaves comprising non-empty alphanumeric strings; and
        signing the pruned DOM tree to generate a message signature for the electronic document,
        wherein said hash function generates a same message signature for a first electronic document and a second electronic document that have a same DOM structure but different textual leaves.

* * * * *